April 27, 1926. Re. 16,338
F. E. RICKETTS
ARC EXTINGUISHER
Original Filed March 13, 1916
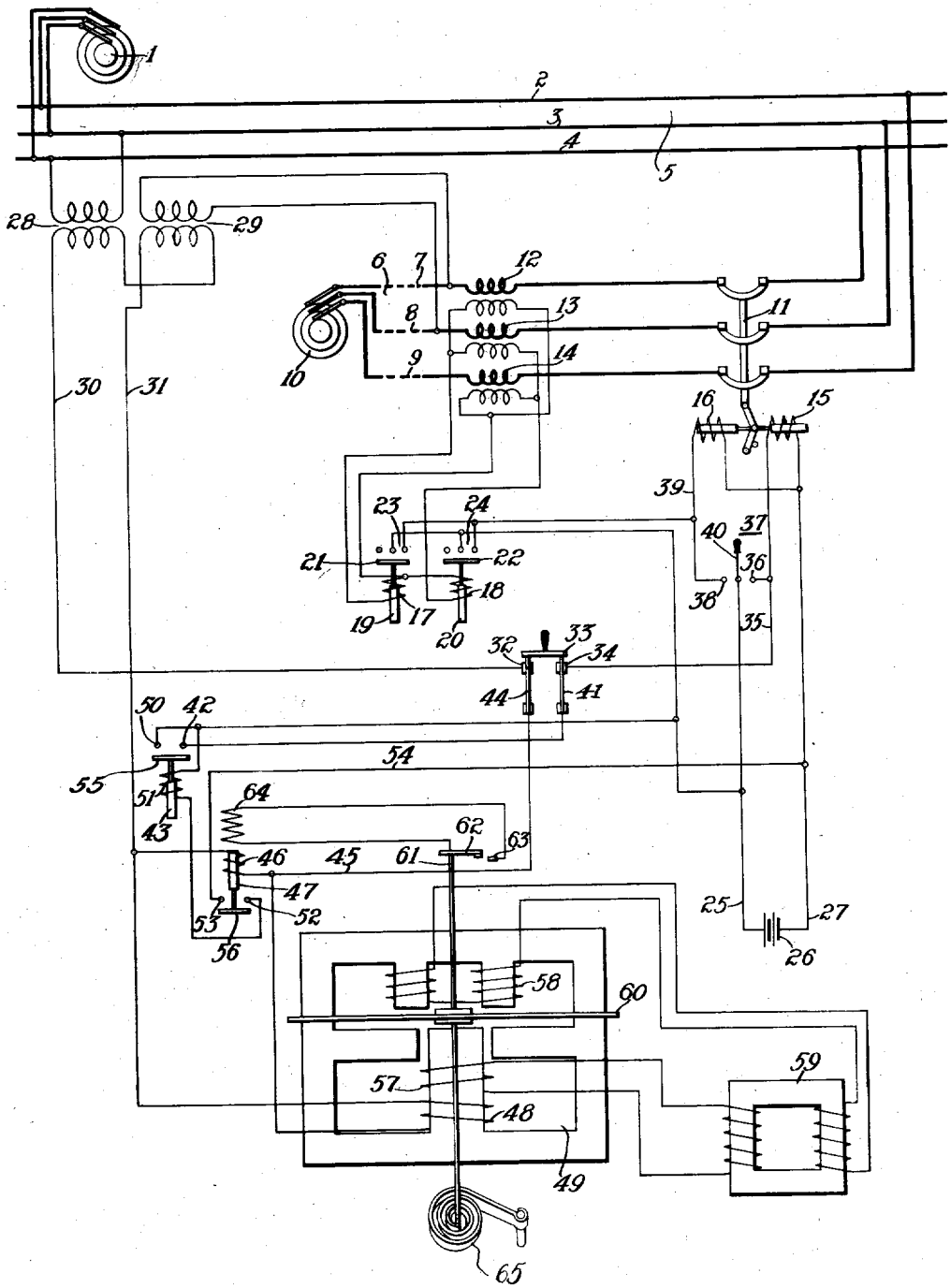
WITNESSES:
H. J. Shelhamer
J. B. Foster
INVENTOR
Forrest E. Ricketts
BY
Wesley G. Carr
ATTORNEY Reissued Apr. 27, 1926. Re. 16,338

UNITED STATES PATENT OFFICE.

FORREST E. RICKETTS, OF CATONSVILLE, MARYLAND.

ARC EXTINGUISHER.

Original No. 1,308,257, dated July 1, 1919, Serial No. 83,786, filed March 13, 1916. Application for reissue filed May 5, 1920. Serial No. 379,146.

*To all whom it may concern:*

Be it known that I, FORREST E. RICKETTS, a citizen of the United States, and a resident of Catonsville, in the county of Baltimore and State of Maryland, have invented a new and useful Improvement in Arc Extinguishers, of which the following is a specification.

My invention relates to electrical systems of distribution and particularly to apparatus for extinguishing arcs that occur in such systems without disturbing the operation of the apparatus connected thereto.

One object of my invention is to provide a device of the above indicated character that shall so alternately open and close a circuit interrupter to reduce the voltage of the circuit that the arc will be extinguished without causing the apparatus connected to the circuit to fall out of synchronism.

Another object of my invention is to provide a device of the above indicated character that shall have means for preventing the automatic opening and closing of the interrupter if the arc is not extinguished within a predetermined time.

Patent No. 1,201,218, dated October 10, 1916, discloses a device for reducing and restoring the voltage of a generator to extinguish an arc. The device operates upon the principle that an arc will break within a fraction of a second after the voltage has been reduced substantially to zero. While a device of this type operates satisfactorily in a distributing system as a whole, it does not provide means for independently extinguishing the arcs in the feeder circuits. In my present invention, I provide a circuit interrupter that is adapted to be opened when a short circuit or an arc occurs, and I further provide means for reclosing the interrupter in accordance with the difference in voltage between the respective sides of the interrupter. Since some short circuits are of a permanent nature and are not maintained by an arc, I provide means to prevent the continued automatic opening and closing of the interrupter if the short circuit persists for a predetermined time. It has been found that this time should be such that an ordinary arc would be extinguished if the interrupter were permitted to alternately open and close a predetermined number of times.

The single figure of the accompanying drawing is a diagrammatic view of a distributing system that is provided with an arc-extinguishing means embodying my invention.

A generator 1 supplies energy to the main conductors 2, 3 and 4 of a distributing system 5. A feeder circuit 6, comprising conductors 7, 8 and 9, is operatively connected between the main distributing circuit 5 and a load 10, such as a motor or other similar device. The feeder circuit 6 is provided with a circuit interrupter 11 and with series transformers 12, 13 and 14 that are connected to its respective conductors.

The circuit interrupter 11 is provided with a closing electromagnet 15 and a tripping electromagnet 16. The secondary windings of the transformers 12, 13 and 14 are operatively connected to windings 17 and 18 of overload relays 19 and 20 that are provided with movable contact members 21 and 22. The movable contact members 21 and 22 are adapted to engage stationary contact members 23 and 24 when a short circuit occurs on the feeder circuit 6. The contact members 23 and 24 are connected in parallel between one terminal of the winding of the electromagnet 16 and one terminal 25 of an electromotive force generator 26. The other terminal of the electromagnet 16 is connected to the other terminal 27 of the electromotive force generator 26. Thus, the circuit breaker 11 is adapted to be tripped when a short circuit occurs across any of the conductors of the feeder circuit 6.

The primary winding of a transformer 28 is connected across the conductors 3 and 4 of the main circuit 5, and the primary winding of a similar transformer 29 is connected across the corresponding conductors 7 and 8 of the feeder circuit 6. Thus, the primary windings of the transformers 28 and 29 are, in reality, connected to the same conductors but are separated by the circuit interrupter 11. The secondary windings of the transformers 28 and 29 are differentially connected to two conductors 30 and 31 so that, when the circuit interrupter 11 is closed, one of the windings neutralizes the effect of the other, and no current traverses the conductors 30 and 31. However, when the circuit interrupter 11 is tripped, the transformer 29 will be disconnected from the main circuit while the voltage of the transformer 28 will be substantially normal. Hence, a voltage will be impressed across the conductors 30 and 31.

The conductor 30 is connected to one stationary contact terminal 32 of a double-pole single-throw switch 33. The corresponding stationary contact terminal 34 of the switch 33 is connected, through a conductor 35, to one terminal of the winding of the electromagnet 15 the other terminal of which is connected to the terminal 27 of the generator 26. The conductor 35 is also connected to the stationary contact terminal 36 of a single-pole double-throw switch 37 the other stationary contact terminal 38 of which is connected, through a conductor 39, to one terminal of the winding of the electromagnet 16. The movable contact member 40 of the switch 37 is connected to the terminal 25 of the generator 26. The movable contact member 41 of the switch 33 is connected to a stationary contact member 42 of a relay 43, and the remaining movable contact member 44 of the switch 33 is connected, through a conductor 45, to one terminal of the winding 46 of a relay 47 and to one terminal of the winding 48 of a definite time-limit relay 49. The conductor 31 is connected to the other terminal of the winding 46 and also to the other terminal of the winding 48 of the relay 49. The other stationary contact member 50 of the relay 43 is connected to the terminal 25 of the source 26. One terminal of the winding 51 of the relay 43 is connected to the stationary contact member 50, and the other terminal of the winding 51 is connected to the stationary contact member 52 of the relay 47. The other stationary contact member 53 of the relay 47 is connected, through a conductor 54, to the terminal 27 of the generator 26. The winding 51 of the relay 43 is adapted to actuate a movable bridging contact member 55 to engage the stationary contact members 42 and 50, and the winding 46 of the relay 47 is adapted to actuate a movable bridging contact member 56 to engage the stationary contact members 52 and 53.

The relay 49 may be constructed as set forth in Patent No. 1,286,239, dated December 3, 1918, issued to A. W. Copley and B. H. Smith and assigned to the Westinghouse Electric and Manufacturing Company, and comprises a main winding 48, an auxiliary winding 47 and secondary windings 58. A normally saturated transformer 59 is operatively connected between the windings 57 and 58 in order to cause the armature 60 to rotate at a constant speed irrespective of the energy traversing the winding 48. The armature 60 is mounted on a shaft 61 upon which a movable contact member 62 is also mounted. The movable contact member 62 is adapted to engage a stationary contact member 63 a predetermined time after the winding 48 is energized and is biased to the open position by a resetting spring 65. The contact members 62 and 63 constitute the separable terminals of a winding 64 that is adapted to so co-operate with the movable member of the relay 47 that, when the winding 64 is short circuited, the movable contact member 56 will not engage the stationary contact members 52 and 53.

When a close circuit, such as an arc, occurs on the feeder circuit 6, sufficient energy will traverse the windings of the transformers 12, 13 and 14 to cause the movable contact members 21 and 22 of the relays 19 and 20 to engage their respective stationary contact members 23 and 24 to complete a circuit from one terminal of the generator 26 through the electromagnet 16 to cause the circuit interrupter 11 to be tripped. When the circuit interrupter 11 is tripped, the voltage applied to the transformer 29 is reduced due to the short-circuit on the feeder circuit 6, and sufficient voltage will be impressed across the conductors 30 and 31 to cause the relay 47 to operate. The operation of the relay 47 will effect engagement between its movable contact member 56 and its stationary contact members 52 and 53, and the relay 43 will operate to effect engagement between its stationary contact members 42 and 50 and its movable contact member 55. When the movable contact member 55 engages the stationary contact members 42 and 50, a circuit will be completed from one terminal of the generator 26 through the movable contact member 41 and the stationary contact member 34 of the switch 33, the conductor 35 and the electromagnet 15 to the other terminal of the generator 26. Thus, the electromagnet 15 will be energized to close the circuit interrupter 11. Since the time between the opening and closing of the circuit interrupter 11 is relatively short, the motor 10 will not drop out of synchronism. but any arc across the conductors of the feeder circuit 6 will be extinguished. However, if the arc persists after the circuit interrupter 11 is closed, the relays 19 and 20 will again operate to so energize the electromagnet 16 as to trip the circuit interrupter 11, and, when the interrupter 11 is again tripped, the transformers 28 and 29 will again effect the operation of the relays 47 and 43 to immediately close it.

It has been determined that, if the short circuit is caused by a non-permanent arc, it will be extinguished by reducing the voltage to substantially zero a number of times. However, if the short circuit is permanent in nature, it is advisable to prevent the automatic alternate opening and closing of the circuit interrupter after the expiration of a time period during which the circuit interrupter has opened and closed a predetermined number of times. Thus, the first time that the circuit interrupter 11 is interrupted, the winding 48 of the relay 49 will be energized and its armature 60 will start to operate. The relay 49 will be intermittently energized each time the interrupter 11 opens, to actuate the armature 60, and, after a predetermined time interval, during which the interrupter is successively opened and closed, the contact member 62 will engage the contact member 63 to close circuit the winding 64 of the relay 47 and thus render the relay 47 inoperative. Consequently, the circuit interrupter 11 will remain open so long as the winding 64 of the relay 47 remains close circuited. The relay 47 will thus remain inoperative until the voltage across the winding 48 or the winding 46 has been reduced to zero for a sufficient time period to return the movable contact member 56 to its original position. This may be accomplished after the trouble on the feeder circuit 6 has been cleared by opening the switch 33 and closing the circuit interrupter 11 by moving the movable contact member 40 of the switch 37 into engagement with its stationary contact terminal 36. Thus, the motor 10 may be disconnected from the main circuit 5 when a permanent short circuit occurs thereon, and when this short circuit has been removed and the circuit interrupter 11 is again closed, the arc-extinguishing device is in such a position that it may again operate immediately. Similarly, if the arc should be extinguished before the contact member 62 engages the stationary contact member 63 of the relay 49, the circuit interrupter 11 will remain closed, the motor 10 will continue to operate and the relays will be in such position as to be operative whenever another short circuit occurs, the relay 49 being restored to normal by the resetting spring 65.

I do not limit my invention to the particular devices shown, as many modifications may be made therein without departing from the spirit and scope of my invention as set forth in the appended claims.

I claim as my invention:

1. In a system of distribution, the combination with an alternating source of energy, a load circuit and synchronous apparatus connected thereto, of means for automatically reducing the voltage of the circuit and for restoring its voltage before the apparatus connected thereto falls out of synchronism, and a time-limit relay for preventing the restoration of the voltage after it has been alternately reduced and restored for a predetermined time period.

2. In a system of distribution, the combination with an alternating source of energy, a load circuit and synchronous apparatus connected thereto, of means for automatically disconnecting the circuit when an arc obtains thereon and for reconnecting the same before the apparatus connected thereto falls out of synchronism, and means for preventing the reconnection after the arc has existed a predetermined time period.

3. In a system of distribution, the combination with a circuit interrupter and means for opening it when an arc obtains on the system, of a relay for reclosing the interrupter, transformers differentially connected to both terminals of the interrupter to energize the relay to reclose the interrupter, and a time-limit relay adapted to prevent the reclosure of the circuit interrupter when the arc persists for a predetermined time period.

4. In a system of distribution, the combination with a circuit interrupter and means for tripping it when an arc obtains on the system, of a relay for reclosing the interrupter, transformers differentially connected to the terminals of the interrupter to energize the relay to reclose the interrupter, a definite time-limit relay adapted to prevent the automatic reclosure of the circuit interrupter when the arc persists for a predetermined time period, and means for normally reclosing the circuit interrupter.

5. In a system of distribution, the combination with a synchronous source of energy, synchronous apparatus energized therefrom and a circuit interrupter therebetween, of means for automatically opening said interrupter and for so quickly reclosing the interrupter that the synchronous apparatus energized therethrough will not fall out of synchronism, and a time-element relay energized when said interrupter is open for preventing the reclosing of the interrupter after it has been opened and reclosed for a predetermined time period.

6. In a system of distribution, the combination with a source of alternating-current energy, synchronous apparatus supplied thereby and a circuit interrupter therebetween, of means for controlling the interrupter to successively disconnect a portion of the system upon which a fault occurs and reconnect the same before the apparatus connected thereto falls out of synchronism, said means being operative for a predetermined interval after the occurrence of a fault and inoperative thereafter to effect the reconnection of the faulty portion of the system.

7. In a service restoring system, the combination with a circuit interrupter, overload responsive means for opening the interrupter and means for controlling the reclosure thereof, of timing means for controlling the operation of the reclosing means comprising an electromagnetic relay device embodying a member movable in one direction when the relay is energized, a circuit-controlling contact member subject to the influence of the movable member at the end of its path of travel and an auxiliary circuit controlled by the contact member to preclude further reclosures of the interrupter.

8. In a service restoring system, the combination with a circuit interrupter, overload responsive means for opening the interrupter and means for controlling the reclosure thereof, of timing means for controlling the operation of the reclosing means comprising a relay device embodying a member movable in one direction when the relay is energized and normally biased to return to an initial position if the interrupter should remain closed after any reclosure effected prior to the relay attaining the end of its path of travel.

9. A service restoring system for a load circuit comprising an interrupter between the load circuit and a supply circuit, means for opening the interrupter upon the occurrence of abnormal conditions in the load circuit, means for closing the interrupter, a switch for controlling the energization of said closing means and means for controlling the effectiveness of said switch comprising a device operative through a predetermined path of travel, during the operation of which the interrupter may be reclosed a plurality of times if the abnormal conditions in the load circuit persist, and effective after attaining the end of the path of travel to preclude further energization of the closing means through the said switch.

10. A service restoring system for an electric circuit comprising an interrupter provided with closing and tripping means, overload devices for energizing the tripping means, a switch for the closing means and means for controlling the effectiveness of said switch comprising a member movable through a predetemined path of travel and energized to move through said path in one direction when the interrupter opens, said member being effective upon attaining the end of said path of travel to preclude further effectiveness of said closing switch and being also normally biased to return to its initial position if the interrupter be reclosed and remain in closed position.

11. In a service restoring system, the combination with a circuit-interrupter, overload responsive means for opening the interrupter and means for controlling the reclosure thereof, of timing means for controlling the operation of the reclosing means comprising a relay device embodying a member movable in one direction when the relay is energized and means for returning said member to an initial position if the interrupter should remain closed after any reclosure effected prior to the relay attaining the end of its path of travel.

In testimony whereof, I have hereunto subscribed my name this 16th day of April, 1920.

FORREST E. RICKETTS.